Jan. 29, 1929.

P. MUELLER 1,700,207

CORK LINED GASOLINE BIBB

Filed Oct. 17, 1925

Inventor
Philip Mueller

By Cushman Bryant Warby
Attorneys

Patented Jan. 29, 1929.

1,700,207

UNITED STATES PATENT OFFICE.

PHILIP MUELLER, OF DECATUR, ILLINOIS, ASSIGNOR TO ADOLPH MUELLER, TRUSTEE, OF DECATUR, ILLINOIS.

CORK-LINED GASOLINE BIBB.

Application filed October 17, 1925. Serial No. 63,125.

The present invention relates to bibbs, and particularly to those designed for handling fluids which have a tendency to creep through small crevices and joints, as for example, gasoline; so that difficulty is encountered in bibbs of ordinary construction in maintaining a proper, non-leaking, relation of the parts.

I accomplish the object aimed at by providing a bibb having a non-metallic liner between the key seat and key so that the parts may be kept always in snug, leaf-proof condition, and yet be readily manipulated, the excessive friction of metal to metal parts, and consequent difficulty in turning the key, being avoided.

In the accompanying drawings, I have shown one physical embodiment of my invention, but this showing is illustrative and not restrictive of the development.

In the drawings:—

Figure 1:
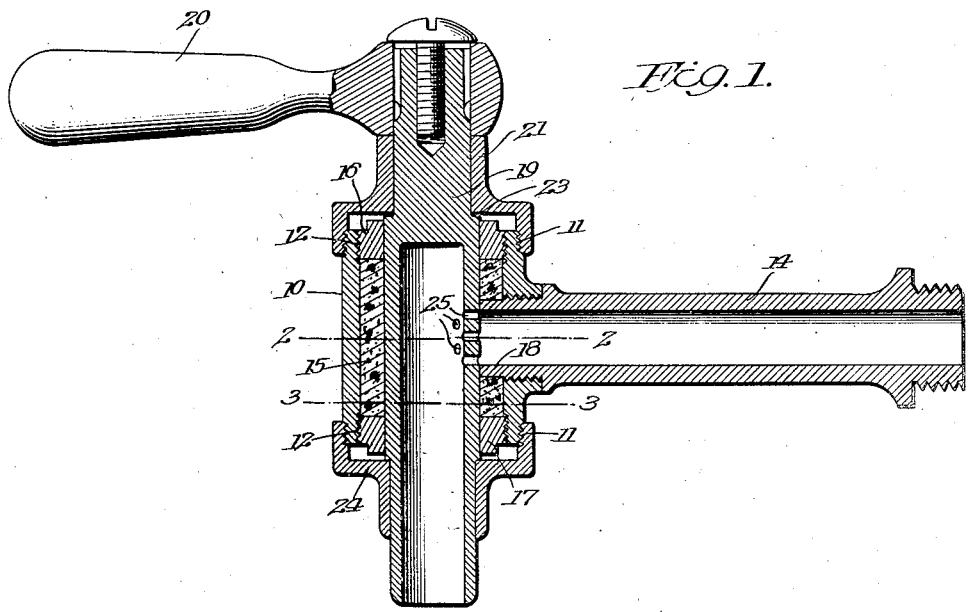
Fig. 1 is a central vertical section of a bibb embodying my improvements.
Figure 2:
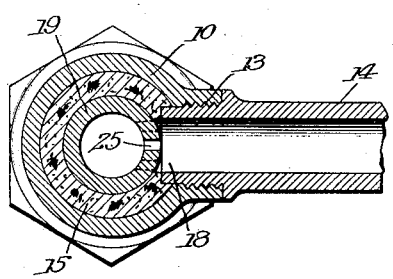
Fig. 2 is a section substantially on the line 2—2 of Fig. 1.
Figure 3:
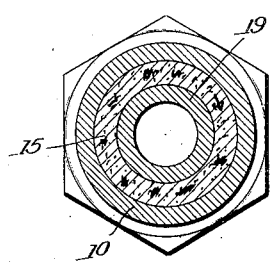
Fig. 3 is a section substantially on the line 3—3 of Fig. 1.

Referring to the drawings by numbers, like numerals indicating like parts in the several views, 10 indicates the body of the bibb, which, as shown, is of cylindrical form, having its ends exteriorly screw threaded at 11, and interiorly screw-threaded at 12. The said body 10 is provided, in its wall, with an aperture 13, preferably screw-threaded, to receive the shank member 14, which may be suitably fashioned at its outer end, as by screw threading, to engage any suitable seat screw or opening in the fluid container to which it is to be applied.

It will be observed that the bore of the bibb 10 presents a smooth, unobstructed interior of considerable length, and seated within the body 10 is a liner 15 formed preferably of cork, although it is conceivable that other materials, suitable for the purpose, might be used. The liner 15 may be either of a continuous section of natural cork, suitably stuffed or filled to take care of the natural interstices, or it may be, and preferably is, made of a cork composition, which compositions are impervious to moisture and may be shaped or fashioned into any desired form. The liner 15 is of substantially the length of the body 10 and fits snugly the bore thereof. It is held and compressed between two nut members 16 and 17 at each end of the body 10, which engage the interior threads 12 at the ends of said body 10. By setting up the nuts 16 and 17, the liner 15 may be compressed more or less to fill the bore of the body 10 and meet the conditions necessary to prevent leakage. The liner 15 will be provided with an opening in its wall to register with the opening 13 in the wall of the body 10, and in order to lock the liner 15 against angular movement, the shank 14 will preferably be extended as at 18, so as to engage with a snug fit the aperture in the side wall of the liner 15 and hold it from angular displacement relative to the body 10.

Seated within the liner 15, and freely rotatable therein, is the key 19 having any suitable handle 20. The key 19 is held in place within the bibb 10 by a cap nut 21 engaging the exterior thread 11 on the body portion 10, said cap nut 21 bearing upon a shoulder 23 on the key 19, so as to hold the key firmly in place.

At its lower or delivery end a second cap nut 24 is provided, engaging the exterior thread 11 at the lower end of the bibb body 10, and closing and finishing the lower end of the bibb, the end of the key 19 projecting through the cap nut 24 as shown. The key 19 will be provided in its wall with one or more lateral passages 25, which, when brought into registry with the end 18 of the shank 14, will permit flow through the hollow key 19.

When the parts are assembled as shown in the sectional view, Fig. 1, the nuts 16 and 17 will be set up until the liner 15 is tightly compressed within the bore of the body of the bibb 10 and about the key 19, so that a leak-proof arrangement is provided. The cap nut 21 and 24 will then be applied so as to cover and finish the end of the bibb, and prevent tampering with the compression nuts 16 and 17, the handle 20 will be applied, and the bibb will be in condition for use.

Owing to the long bearing between the liner 15 and the key 19, danger of leakage of fluid along the key and out at the ends of the bibb is eliminated, and yet, in spite of this long bearing, the key may be easily turned, owing to the non-metal contact, and even though the cork liner 15 be compressed between the compression nuts 16 and 17, there is no likelihood of binding of the key, as the compression of the liner 15 may be carried to the point where leakage past it will be impossible without any danger of gripping the key 19 so that it cannot be turned. Wear may be compensated for readily by removing the caps 21 and 24 and setting up the nuts 16 and 17 to further compress the liner between the key and the wall of the bibb.

With this arrangement, I am able to provide a bibb which will handle fluids which cannot be handled with success where there is metal to metal contact between the key and the bibb, and an accurate fitting and continued grinding in of the key to insure a non-leaking fit of the key in the bibb is done away with. With my construction, the matter of repair and replacement is simple. If the liner 15 becomes worn or broken, or is compressed to the point where it may be no longer compressed to insure a non-leaking bibb, a new liner may be readily substituted by unskilled labor and the bibb immediately placed in proper condition for service.

While it is desirable, of course, that the bore of the bibb body 10 and the exterior of the key 19 be finished accurately and smoothly, the necessity for close fitting of the surfaces is not as great as in the ordinary form of bibb, for the reason that the liner 19, which is of considerable thickness, will, when placed under compression, take care of any slight inaccuracies in contour, both of the bore of the bibb and the exterior of the key.

Such changes from the construction herein shown and described as are within the skill of the mechanic, and the adoption of obvious mechanical expedients other than those here disclosed may be made without departing from the range of my invention.

I claim:

In a bibb of the class described, the combination of a cylindrical body portion having a smooth uninterrupted bore, interiorly and exteriorly threaded ends and a shank aperture, a shank in said aperture, a cork liner of less length than said body portion having an opening in its wall registering with said shank, clamping nuts engaging the interiorly threaded ends of said body portion to compress said liner, cap nuts engaging the exteriorly threaded ends of said body portion, and a hollow key rotatable in said nuts and liner and having lateral passages in communication with said shank, said shank having a portion thereof engaging said liner for preventing rotation of the latter.

In testimony whereof I have hereunto set my hand.

PHILIP MUELLER.